United States Patent
Troberg et al.

(10) Patent No.: US 10,656,698 B2
(45) Date of Patent: *May 19, 2020

(54) INTERACTION BASED CHARGING CONTROL

(71) Applicant: Microsoft Technology Licensing, LLC, Redmond, WA (US)

(72) Inventors: Mikael Troberg, Salo (FI); Jani Mäki, Turku (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,192

(22) Filed: Aug. 23, 2018

(65) Prior Publication Data

US 2018/0364788 A1 Dec. 20, 2018

Related U.S. Application Data

(63) Continuation of application No. 15/096,225, filed on Apr. 11, 2016, now Pat. No. 10,108,245.

(51) Int. Cl.
*G06F 1/3231* (2019.01)
*G06F 1/20* (2006.01)
*G06F 1/26* (2006.01)
*H02J 7/00* (2006.01)

(52) U.S. Cl.
CPC ............ *G06F 1/3231* (2013.01); *G06F 1/206* (2013.01); *H02J 7/007* (2013.01); *H02J 7/0052* (2013.01); *G06F 1/266* (2013.01); *H02J 2007/0062* (2013.01); *Y02D 10/16* (2018.01); *Y02D 10/173* (2018.01)

(58) Field of Classification Search
CPC ........ G06F 1/3231; G06F 1/206; G06F 1/266; H02J 7/0052; H02J 7/007; H02J 2007/0062; Y02D 10/173; Y02D 10/16
USPC ........................................................ 455/573
See application file for complete search history.

(56) References Cited

U.S. PATENT DOCUMENTS

| | | | |
|---|---|---|---|
| 9,663,296 B1* | 5/2017 | Dingle | H02J 7/0027 |
| 2009/0251108 A1* | 10/2009 | Chao | H02J 7/0091 320/153 |
| 2011/0291746 A1* | 12/2011 | Ibrahim | G06F 1/3206 327/538 |
| 2013/0036315 A1* | 2/2013 | Oishi | G06F 1/3206 713/300 |
| 2014/0266019 A1* | 9/2014 | Pigott | H02J 7/045 320/108 |
| 2014/0364102 A1* | 12/2014 | Pham | H04W 52/283 455/418 |
| 2015/0264208 A1* | 9/2015 | Achiwa | H04N 1/00885 358/1.15 |
| 2018/0351390 A1* | 12/2018 | Venkatrannan | H02J 7/025 |

* cited by examiner

*Primary Examiner* — Inder P Mehra

(57) ABSTRACT

Interaction based charging control is described. In an embodiment, a device is described, comprising: an interface configured to receive a charging power from another device; a sensor configured to detect interaction of the device; a charging controller configured to reduce the charging power in response to the detected interaction; in response to the reduced charging power, a processor configured to allow more processing power for the device. In other embodiments, a device comprising a sensor configured to detect a temperature of the device, and a method are discussed.

20 Claims, 4 Drawing Sheets

INTERACTION BASED CHARGING CONTROL

CROSS-REFERENCE TO RELATED APPLICATIONS

This application is a continuation of U.S. application Ser. No. 15/096,225 filed Apr. 11, 2016, the entirety of which is hereby incorporated by reference herein.

BACKGROUND

Many portable or mobile devices comprise a battery, which acts as a power source for the device. As performance of the device increases, requirements of the battery increase. It should be charged fast and effectively. Some devices use different kind of fast charging solutions, for example with charging power of more than 15 W. Even with relatively high efficiency, there is still a considerable thermal impact. The devices may heat up during the charging process. The end-user may feel that the device is uncomfortably hot. It is also possible that the device has heated up internally so much that the performance of the device may deteriorate.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Interaction based charging control is described. In an embodiment, a device is described, comprising: an interface configured to receive a charging power from another device; a sensor configured to detect interaction of the device; a charging controller configured to reduce the charging power in response to the detected interaction; in response to the reduced charging power, a processor configured to allow more processing power for the device.

In other embodiments, a device comprising a sensor configured to detect a temperature of the device, and a method are discussed.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

Figure 1:
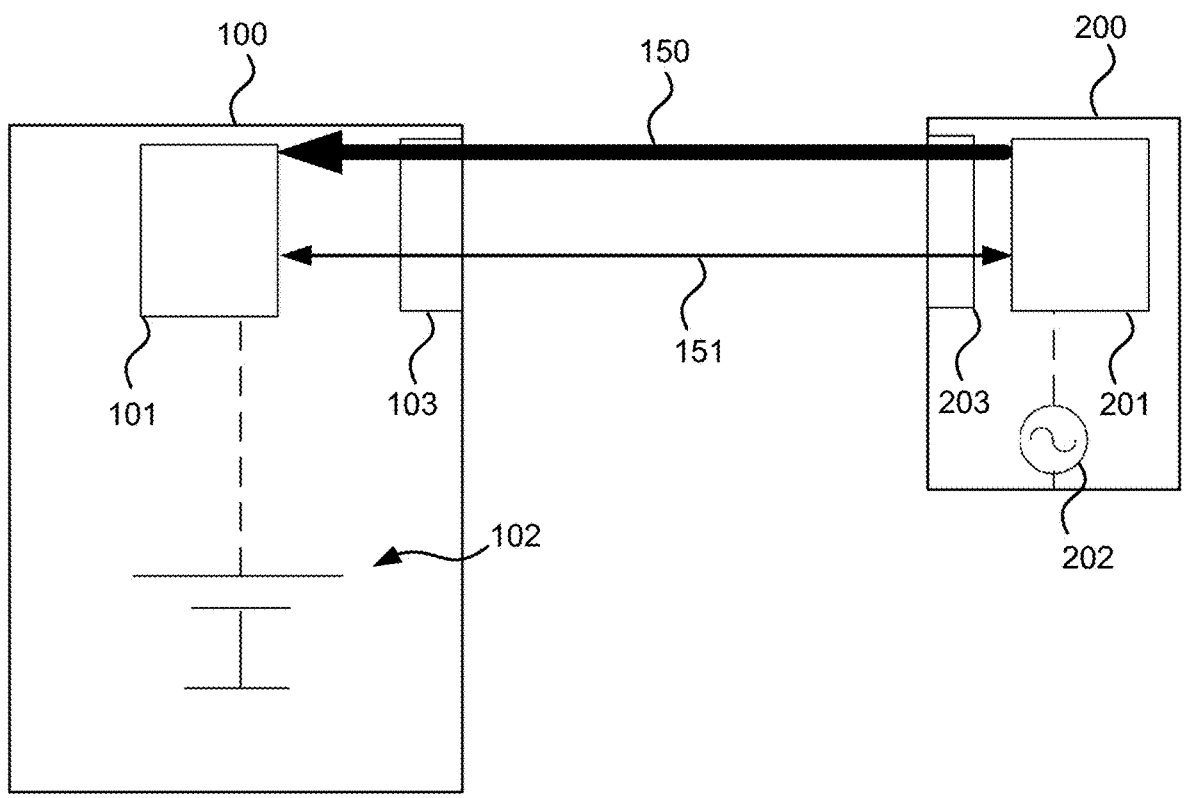
FIG. 1 illustrates a schematic representation of a computing device which is connected to a power supplying device for interaction based power delivery between the devices according to an embodiment.

The detailed description provided below in connection with the appended drawings is intended as a description of the embodiments and is not intended to represent the only forms in which the embodiment may be constructed or utilized. However, the same or equivalent functions and structures may be accomplished by different embodiments.

Although the embodiments may be described and illustrated herein as being implemented in interaction of a device based power delivery between the device having a battery and a charger, this is only an example of an adaptive power delivery between a computing device and a power source and not a limitation. As those skilled in the art will appreciate, the present embodiments are suitable for application in a variety of different types of adaptive power deliveries, for example using a temperature dependent charging process. An embodiment may be a part of local connectivity between different devices. However, it is a part of a power or charge architecture as well. The interaction may be interaction of the device and/or a user interaction with the device. For example, wireless communication for convey data communications with or without user interaction, heavy data processing with or without user interaction, motion of the device or the user, gestures of the device or the user, a touch of the device by the user, etc.

The term 'computer', 'computing device', 'device' or 'mobile device' is used herein to refer to any device with processing capability such that it can execute instructions or execute hardware logics. Those skilled in the art will realize that such processing capabilities are incorporated into many different devices and therefore the terms 'computer' and 'computing device' each include PCs, servers, mobile telephones (including smart phones), tablet computers, set-top boxes, media players, games consoles, personal digital assistants and many other devices.

An embodiment uses sensors of battery powered computing device for detecting when interaction takes place at the device. For example, when the end-user picks up the device. When interaction is detected, the charging power may be reduced relatively fast. According to an embodiment, the charging power may dependent on a charging current and/or a charging voltage. For example, the charging current and/or the charging current may be reduced relatively fast, when interaction is detected. Consequently, the device may feel less warm to the end-user. Furthermore, it may enable the usage of high power applications without thermal ramifications. When charging power decreases, the temperature of the device decreases. Heat generating processes, such as imaging, processing, etc. may be provided with more power, and operating performance of the device may be thereby increased. Once the interaction has ended, the charging may resume with the maximum power.

According to an embodiment, early and reliable detection of interaction may be achieved. The earlier the device detects the interaction, the more time it has for reducing the device power dissipation, even before the actual use case is enabled. The end-user may have a cooler device in hands. Furthermore, there is more thermal headroom for any use case that the end-user would like to do. Because of various sensors and possible filtering and delay process, a reliable detection may avoid a false detection. Furthermore, charging speed may be increased, if there is no high power use case need for the device, and overall better user experience may be achieved.

According to an embodiment, the device may also detect use case scenarios, where the device is still actively being used but the display is turned off. For example, during a phone call or when the display is just turned off while holding the device. Furthermore, erroneous processes for reducing the charging power may be reduced. For example when receiving a message, the display is turned on, which may lead to the lower charging current unnecessarily, unless filtered.

FIG. 1 illustrates a schematic representation of an embodiment, wherein a computing device 100 is connected to a power supply 200 by a cable 150. The power supply 200 or alternatively referred to as a power suppling device may be a universal serial bus, USB, charger. Although the embodiment of FIG. 1 illustrates a wired charging based on USB having a cable 150, an embodiment may relate to wireless charging also. In the wireless charging one of the charging or communication between the computing device 100 and the power supplying device 200 may be conducted wirelessly. According to an embodiment, both charging and communication between the devices 100,200 are wireless. Because long distance wireless charging may generate a considerable amount of heat due to inefficiently, the interaction based charging control may reduce the heat and be convenient for the user.

The computing device 100 may include a charging control block 101 configured to control the power delivery of the computing device 100. Alternatively, the control may be performed at a power supplying device 200, and the device 100 may have sensors only, etc. The computing device 100 includes an interface 103 for connecting via the cable 150 to the power supplying device 200. The cable 150 may be a USB cable and the interface 103, a USB interface. According to an embodiment, a wireless connection may be used instead of the cable 150. The interface 103 is connected to the charging control block 101. According to an embodiment, the charging control block 101 may be referred to as a charging controller. The computing device 100 includes a battery 102. The battery 102 is connected to the charging control block 101. The power supplying device 200 may be a USB peripheral device or a charger. For example, the computing device 100 is configured as a USB host (Down Facing Port, DFP) and the power supplying device 200 is configured as a USB device (Up Facing Port, UFP). The power supplying device 200 includes an interface 203 for connecting to the cable 150. The interface 203 may be USB interface or another kind of interface that is used for a charging or a power delivery. The power supplying device 200 also includes a power delivery control block 201. The power supplying device 200 includes a power supply interface 202 which is configured to receive power from the power grid. A communication channel 151 is illustrated between the devices 100, 200. The communication channel 151 is used for communicating the power delivery information between the devices 100,200, and to instruct the devices 100,200 based on the detected interaction or the detected temperature. According to an embodiment, the communication channel 151 may be a part of the cable 150. According to an embodiment, the communication channel may be wireless.

There may be a variety of different types of computing devices 100 such as a pc, lap top, portable computer, mobile device, mobile phone, tablet, phablet, etc. Likewise, the power supplying devices 200 may include peripheral devices such as chargers, power stations, power batteries, power grid points, or any other power supplying devices. In some embodiments, power supplying device 200 may be likewise another pc, lap top, portable computer, mobile device, mobile phone, tablet, phablet etc. configured to deliver power to a connected computing device 100.

Figure 2:
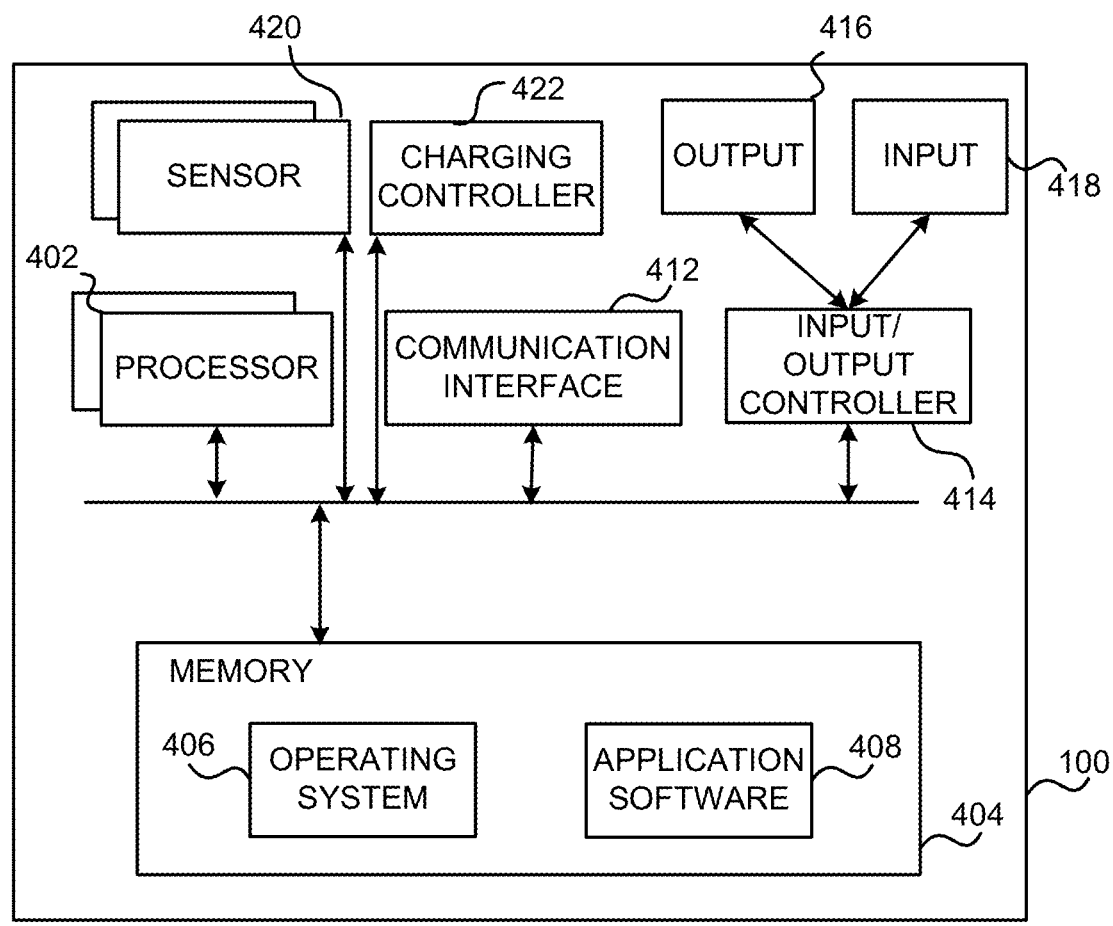
FIG. 2 illustrates a schematic representation of a computing device having interaction based charging controller according to an embodiment.

FIG. 2 illustrates an embodiment of components of a computing device 100 which may be implemented as a form of a computing and/or electronic device. The computing device 100 comprises one or more processors 402 which may be microprocessors, controllers or any other suitable type of processors for processing computer executable instructions to control the operation of the device 100. Platform software comprising an operating system 406 or any other suitable platform software may be provided on the apparatus to enable application software 408 to be executed on the device.

Computer executable instructions may be provided using any computer-readable media that are accessible by the device 100. Computer-readable media may include, for example, computer storage media such as a memory 404 and communications media. Computer storage media, such as a memory 404, include volatile and non-volatile, removable and non-removable media implemented in any method or technology for storage of information such as computer readable instructions, data structures, or program modules. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, in a modulated data signal, such as a carrier wave, or other transport mechanism. Although the computer storage medium (the memory 404) is shown within the device 100, it will be appreciated that the storage may be distributed or located remotely and accessed via a network or other communication link (e.g. using a communication interface 412).

The device 100 may comprise an input/output controller 414 arranged to output information to an output device 416 which may be separate from or integral to the device 100. The input/output controller 414 may also be arranged to receive and process an input from one or more input devices 418. In one embodiment, the output device 416 may also act as the input device. The input/output controller 414 may also output data to devices other than the output device, e.g. a locally connected printing device. According to an embodiment, the device 100 comprises various sensors 420. The sensor 420 may be configured to detect the interaction. For example, the sensor 420 may be accelerometer, 3D sensor, force sensor, capacitive sensor, resistive sensor, light or proximity sensor, etc. Furthermore, the sensor 420 may be configured to detect the temperature of the device 100. The temperature may be detected from several different locations within the device 100. There may be several sensors 420. The device 100 comprises also a charging controller 422. According to an embodiment, the charging controller 422 is configured to reduce the charging current to limit the power dissipation based on interaction detected by at least one of the sensors 420.

For example, the sensor 420 is configured for detecting interaction and/or temperature. Interaction and/or temperature with the device 100 may be detected by a single sensor 420 or combination of sensors 420 in the device 100. The detection may be based on touching the device 100 and/or moving the device 100. Motion may be detected with several different kinds of sensors 420 such as accelerometer and 3D sensor. According to an embodiment the sensor 420 in combination with a processor 402 and the software 408 may be configured to detect human gestures, such as picking up the device 100 from the table. The sensor 420 has to be active while charging, however the current consumption impact, which is caused by the sensor 420, is negligible. Touching may be detected with one or more sensors 420 as well, for example including a capacitive sensor, a force sensor and/or a touchscreen. Touching may be an easy method to detect the human interaction. The sensor 420 has to be active while charging, however the current consumption is negligible. Other embodiments of the sensors 420, which may be commonly found in mobile devices, may be an ambient light sensor and a proximity sensor. These embodied sensors 420 may be used to detect whether the device 100 is in a bag or in a pocket. For example, it may be possible to charge a device 100 from a portable power pack, while the device 100 is in a bag. Since the device 100 would heat up a lot in a tight bag, the charging power may be reduced in this case.

Once the device 100 has determined interaction, the device 100 may reduce the charging power. According to an embodiment the charging controller 422 may immediately reduce the charging current in order to limit the power dissipation. This may cool down the device 100 and allow for more power from the overall power budget to be used for something else than charging. According to an embodiment, dropping a part of the charging power out may rapidly lower the temperature inside the device and ICs (within seconds). Furthermore the surface temperature may drop, although at a slower rate than inside the device 100. Reduction in internal temperature and power dissipation may allow for more power to be used, for example for processing power, which leads to better user experience while using the device 100. The cooler device in hands may also be appreciated by the end user. According to an embodiment, due to an increase in the processing power a processor speed may increase, the processor 402 may use more memory 404 and/or buffering, or the processor 402 may make particular optimizations for more performance. Furthermore, more processing power may start to use a further processor.

Referring to FIG. 2, according to an embodiment, processor 402 and/or charging controller 422 may filter the sensed interaction detected by sensors 420 to prevent false positives.

The functionality described herein can be performed, at least in part, by one or more hardware logic components. According to an embodiment, the computing device 100 is configured by the program code 406,408 when executed by the processor 402 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 3:
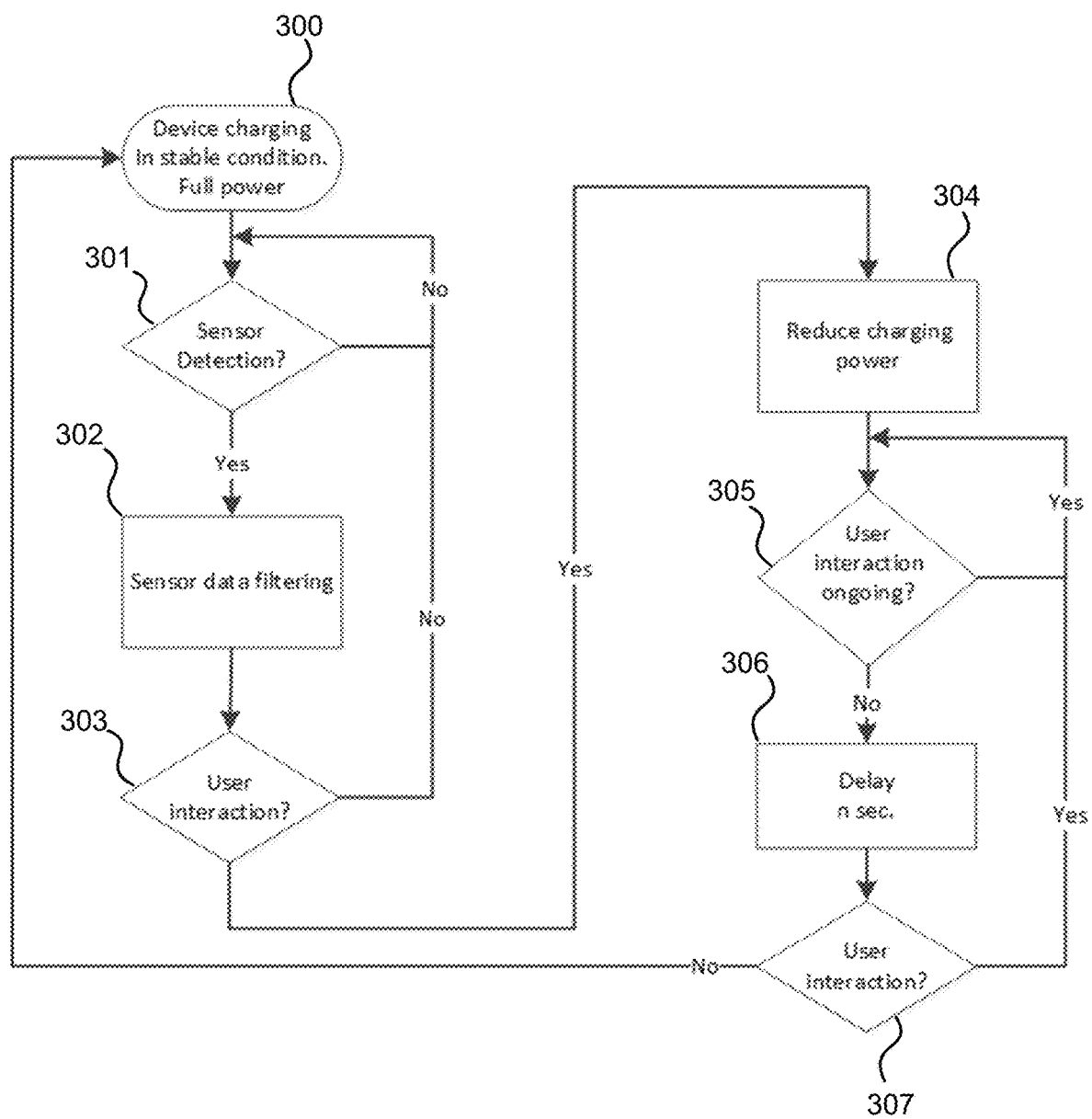
FIG. 3 illustrates a schematic flow chart of delivering power based on interaction in accordance with an embodiment.

FIG. 3 illustrates a schematic flow chart of delivering power based on interaction in accordance with an embodiment. Referring to FIG. 3, according to an embodiment the process may be utilized in the computing device 100 and the power supplying device 200 shown in FIGS. 1 and 2 for power delivery based on the interaction. According to an embodiment, the process of FIG. 3 may be compiled into the program code 406,408.

In operation 300 the power supplying device 200 charges the computing device 100. This may be performed in a stable condition with full charging power. A relatively fast charging may be achieved.

In operation 301 at least one sensor 420 of the device 100 is configured for detection. For example the sensor 420 is configured for detecting interaction and/or temperature. Interaction and/or temperature with the device 100 may be detected by a single sensor 420 or combination of sensors 420 in the device 100. The detection methods may be based on touching the device 100 and/or moving the device 100.

Motion may be detected with several different kinds of sensors 420 such as accelerometer and 3D sensor. According to an embodiment the sensor 420 in combination with a processor 402 and the software 408 may be configured to detect human gestures, such as picking up the device 100 from the table. The sensor 420 has to be active while charging, however the current consumption impact, which is caused by the sensor 420, is negligible.

Touching may be detected with one or more sensors 420 as well, for example including a capacitive sensor, a force sensor and/or a touchscreen. Touching may be an easy method to detect the human interaction. The sensor 420 has to be active while charging, however the current consumption is negligible.

Other embodiments of the sensors 420, which may be commonly found in mobile devices, may be an ambient light sensor and a proximity sensor. These embodied sensors 420 may be used to detect whether the device 100 is in a bag or in a pocket. For example, it may be possible to charge a device 100 from a portable power pack, while the device 100 is in a bag. Since the device 100 would heat up a lot in a tight bag, the charging power may be reduced in this case.

If there is no sensor detection, the process of FIG. 3 returns to the charging operation 300. If detection is performed, the process proceeds to operation 302 sensor data filtering.

In operation 302 filtering of sensor data may be carried out. According to an embodiment, a filtering algorithm may be configured to avoid false detections, for example when the device 100 is in a vehicular environment. The software 404, which is executed by the processor 402 may be configured to operate the filtering algorithm. Furthermore, it may be possible that the sensor or sensors 420 detects something else than actual human interaction. Consequently, data filtering may be needed to avoid false detections. Using more than one sensor 420 may increase the reliability of the detection system. Furthermore, sensor output quality may also lead to false detections, increasing the need for filtering.

According to an embodiment the false or erroneous detections and the filtering may relate to the following situation. Vibration of the device 100 in a vehicular environment may be detected by a motion sensor. The vehicular environment may cause erroneous detection by the motion sensor. This may be filtered by detecting the motion pattern, for example a frequency and an amplitude of the motion of the vehicular environment.

According to another embodiment, when the device 100 is in the pocket, a combination of an ambient light sensor and a motion sensor may be used to detect this situation. Consequently, a human step calculation algorithm can be part of detection mechanism and part of the device 100.

In operation 303 interaction may be determined. Interaction may be determined based on the operation 301: sensor detection and the operation 302: filtering. If interaction is not determined, the process returns to the operation 301. If interaction is determined, the process proceeds to operation 304 reduce charging power.

Once the device 100 has determined interaction, the device 100 may reduce the charging power. According to an embodiment the charging controller 422 may immediately reduce the charging current in order to limit the power dissipation. This may cool down the device 100 and allow for more power from the overall power budget to be used for something else than charging. According to an embodiment, dropping a part of the charging power out may rapidly lower the temperature inside the device and ICs (within seconds). Furthermore the surface temperature may drop, although at a slower rate than inside the device 100. Reduction in internal temperature and power dissipation may allow for more power to be used, for example for processing power, which leads to better user experience while using the device 100. The cooler device in hands may also be appreciated by the end user.

In operation 305, interaction is determined. It is determined whether interaction is ongoing. The sensors 420 provide data, which may be filtered, for determining the possibly ongoing interaction. If interaction is determined, the process remains in the same operation, and lower charging level is maintained. When interaction is not determined, the process proceeds to operation 306.

In the operation 306 a delay of n seconds is added to the process. According to an embodiment, the delay may be 30 seconds, however other numerical values may be applied. The operation delay 307 is used to filter short moments of non-activity. The process should not be too eager to go back to full power charging. Consequently, erroneous decision to return to the full charging may be prevented by a small delay period.

After the delay if interaction is determined in operation 307, the process may return to the operation 305. After the delay if interaction is not determined, the process return to the operation 300.

Figure 4:
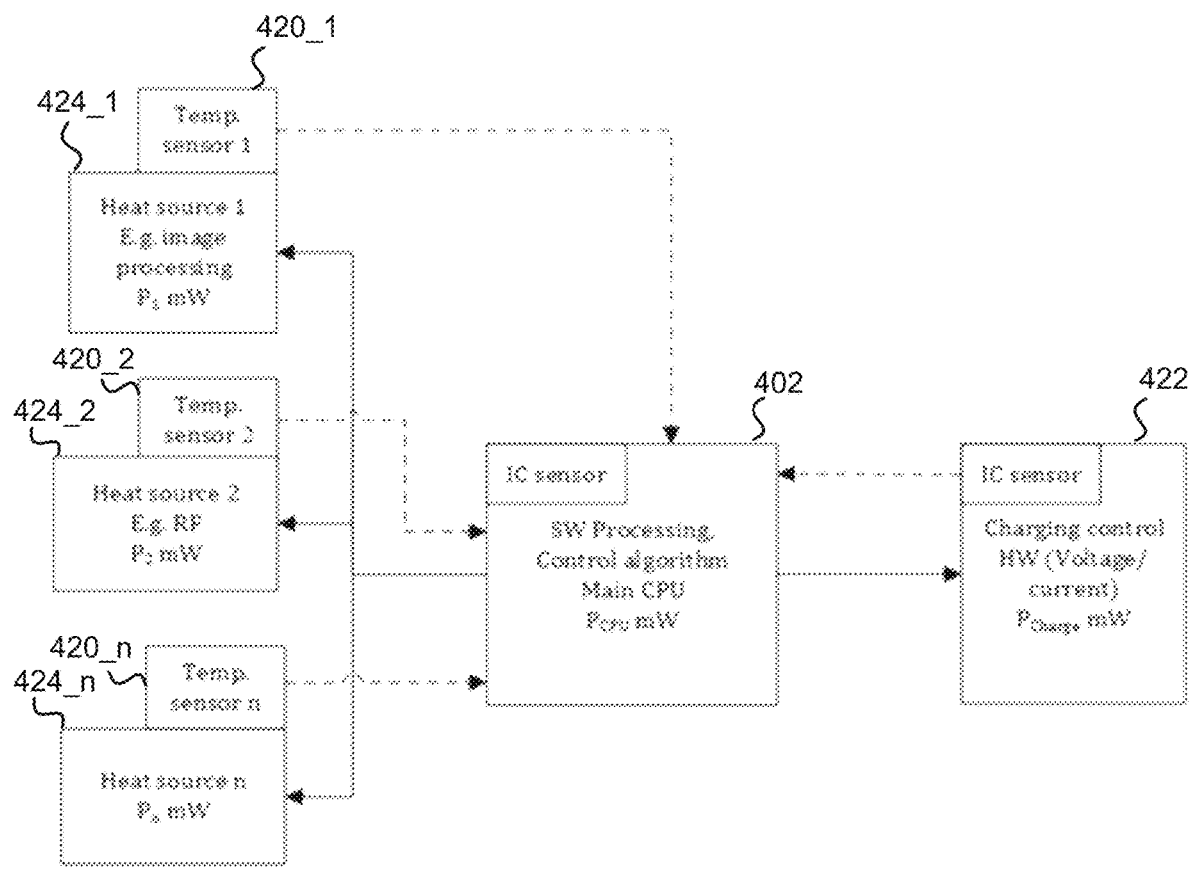
FIG. 4 illustrates a schematic block diagram of a computing device comprising thermal control parts and a power budget determination processor according to an embodiment.

FIG. 4 illustrates a schematic block diagram of a computing device 100 comprising thermal control parts and a power budget determination according to an embodiment. The embodiment of FIG. 4 illustrates an overview of a thermal control of the device 100. The device 100 comprises temperature sensors 420_1-420_n. There may be n pieces of sensors 420. The processor 402 and the charging control 422 are also illustrated in FIG. 4.

Each temperature sensor 420 may relate to a respective heat source 424_1 to 424_n. The heat sources 424_1-424_n may be image processing, RF, etc. Each heat source 424_1-424_n may have a respective power $P_1$-$P_n$. The power represents operating power of the heat source. The processor 402 has a processing power $P_{CPU}$. The charging control 422 has a power $P_{Charge}$. A total power budget is the sum of the powers of the different sub-systems as follows:

$$P_{total}=P_1+P_2+\ldots+P_n+P_{CPU}+P_{Charge}.$$

There may be a maximum limit for $P_{total}$, which may be based on device heat dissipation capabilities and maximum allowed temperatures for different parts of the device 100. By reducing the power dissipation from certain operations, more power budget may be then released for some other operations. According to an embodiment the focus may be on reducing charging power $P_{Charge}$ in FIG. 4. while the device is being actively used by the user, primarily allowing more power to be used, for example, for processing power or imaging. Furthermore, the device temperature may also be reduced, leading to more comfortable user experience.

Mobile devices may have various different kind of cooling mechanisms built inside the device 100 with a purpose of keeping the thermally sensitive components, such as CPU, as cool as possible. These may include thermal tapes, heat sinks and heat pipes among others. The cooling mechanisms may be very effective and may reduce local temperature by several degrees Celsius in a second, if the thermal power is reduced. If the device 100 detects interaction early, for example, in a few seconds, and reduce power dissipation, there may be more power budget for smoother user experience right from the start of a use case.

According to an embodiment, there may not necessarily be anything connected to another end of the cable plug, but the devices 100,200 may act partially independently for performing the functions and operations of the embodiments.

A charging level may dependent on interaction of the device 100. When there is no interaction of the device 100, or few interactions, the level of charging power may be high for achieving fast and powerful charging. When there is interaction of the device 100, the level of the charging power may be reduced. The more there are interactions detected, the more the charging level is reduced. According to the embodiment, the power budget $P_{total}$ total may be used to determine the appropriate level of charging. According to an embodiment, a device temperature from the temperature sensor 420 may be used to reduce the level of the charging. For example, high temperature detected by the temperature sensor 420 may lead to a lower level of charging than a low temperature.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store, parts or all of, an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

According to an embodiment, a device, comprising: an interface configured to receive a charging power from another device; a sensor configured to detect interaction of the device; a charging controller configured to reduce the charging power in response to the detected interaction; and in response to the reduced charging power, a processor configured to allow more processing power for the device.

Alternatively or in addition to the above, the interaction comprises a motion of the device, and the sensor comprises a motion sensor. Alternatively or in addition to the above, the motion relates to a gesture made by the user. Alternatively or in addition to the above, the interaction comprises a touch of the device, and the sensor comprises a touch sensor. Alternatively or in addition to the above, the sensor comprises a proximity sensor. Alternatively or in addition to the above, further including various sensors configured to detect at least two different kinds of interaction. Alternatively or in addition to the above, further including a temperature sensor configured to detect a temperature inside the device. Alternatively or in addition to the above, the processor is further configured to filter the detected interaction. Alternatively or in addition to the above, the processor is configured to filter by detecting a predetermined motion pattern and eliminate the pattern. Alternatively or in addition to the above, the sensor is further configured to detect a termination of the interaction; in response to the detected termination of the interaction, the processor is configured to decrease the processing power; and the charging controller is further configured to increase the charging power in response to the detected terminated interaction. Alternatively or in addition to the above, the charging controller is configured to resume the charging power to a maximum level. Alternatively or in addition to the above, the charging controller is configured to increase the charging power in response to a termination of the interaction after a delay has been lapsed. Alternatively or in addition to the above, the processor receives a temperature value of the sensor and establish a corresponding power value of a sub system, which the sensor is measuring, and a charging power value from the charging controller, and determines a processing power value; and wherein the processor is configured to accumulate a total power from the corresponding power value, the charging power value and from the processing power value. Alternatively or in addition to the above, the processor is configured to compare the power sum to a predetermined maximum power value. Alternatively or in addition to the above, the processor is configured to increase power for certain operation, if the power sum is below the predetermined maximum power value. Alternatively or in addition to the above, the processor is configured to reduce the charging power and increase the processing power corresponding to amount of the reduced charging power. Alternatively or in addition to the above, the processing power is configured for image processing of the device, applications of the device, or communications of the device. Alternatively or in addition to the above, the device comprises a battery for powering the device and configured to receive the charging, and the device comprises a mobile device.

According to an embodiment, a device, comprising: an interface configured to receive charging power from another device; a first sensor configured to detect a temperature of the device; a second sensor configured to detect interaction of the device; and a charging controller configured to set a level of the charging power based on both the temperature and the interaction.

According to an embodiment, a method, comprising: receiving, by an interface of a device, a charging power from another device; detecting, by a sensor, interaction of the device; reducing, by a charging controller, the charging power in response to the detected interaction; and in response to the reduced charging power, increasing, by a processor, a processing power of the device.

The embodiments illustrated and described herein as well as embodiments not specifically described herein but within the scope of aspects of the disclosure constitute exemplary means for detecting interaction and means for reducing charging based on the detected interaction. For example, the elements illustrated in FIG. 1 to FIG. 4 constitute exemplary means for charging another device; exemplary means for detecting temperature of the device; exemplary means for detecting interaction; exemplary means for setting charging based on both temp and interaction; exemplary means for reducing charging power; and in response to reduced charging power, exemplary means for increasing processing power of the device.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
an interface configured to receive charging power from another device;
a sensor configured to detect a user picking up the device; and
a charging controller configured to reduce a level of the charging power based on the detection of the user picking up the device.

2. The device of claim 1, wherein the sensor is further configured to detect a temperature, and wherein the charging controller is further configured to reduce a level of the charging power based on the detection of the user picking up the device and the temperature.

3. The device of claim 1, wherein the processor receives a temperature value of the sensor and establishes a corresponding power value of a sub system, which the sensor is measuring, and a charging power value from the charging controller, and determines a processing power value, and wherein the processor is configured to accumulate a total power from the corresponding power value, the charging power value and from the processing power value.

4. The device of claim 3, wherein the processor is configured to increase power for certain operation, if a power value is below the predetermined maximum power value.

5. The device of claim 4, wherein the processor is configured to reduce the charging power and increase the processing power corresponding to amount of the reduced charging power.

6. The device of claim 1, wherein the processor is configured to reduce the charging power based on an increase in processing power to the device.

7. The device of claim 1, wherein the processing power is configured for image processing of the device, applications of the device, or communications of the device.

8. The method, comprising:
receiving, by an interface of a device, a charging power from another device;
detecting, by a sensor, a user picking up the device; and
reducing a level of the charging power based on the detection of the user picking up the device.

9. The method of claim 8, further comprising:
detecting, by the sensor, a temperature of the device;
receiving a temperature value of the sensor;
establishing a corresponding power value of a sub system, which the sensor is measuring, and a charging power value from a charging controller;
determining a processing power value;
accumulating a total power from the corresponding power value, the charging power value and from the processing power value; and
reducing the level of the charging power based on the temperature and the detection of the user picking up the device.

10. The method of claim 9, further comprising comparing the power value to a predetermined maximum power value.

11. The method of claim 10, further comprising increasing power for certain operation if the power value is below the predetermined maximum power value.

12. The method of claim 11, further comprising reducing the charging power and increasing a processing power corresponding to amount of the reduced charging power.

13. The method of claim 8, further comprising reducing the charging power based on an increase in processing power to the device.

14. The method of claim 8, wherein the processing power is configured for image processing of the device, applications of the device, or communications of the device.

15. One or more computer-readable storage devices comprising computer-executable instructions that, when executed by one or more processors, cause the one or more processors to perform the following operations:
receiving, by an interface of a device, a charging power from another device;
detecting, by a sensor, a user picking up the device;
reducing a level of the charging power based on the detection of the user picking up the device.

16. The one or more computer-readable storage devices of claim 15, wherein the computer-executable instructions further cause the one or more processors to perform the following operations:
detecting a temperature of the device;
receiving a temperature value of the sensor;
establishing a corresponding power value of a sub system, which the sensor is measuring, and a charging power value from a charging controller;
determining a processing power value;
accumulating a total power from the corresponding power value, the charging power value and from the processing power value; and
reducing the level of the charging power based on the temperature and the detection of the user picking up the device.

17. The one or more computer-readable storage devices of claim 16, wherein the computer-executable instructions further cause the one or more processors to perform the following operation:
comparing the power value to a predetermined maximum power value.

18. The one or more computer-readable storage devices of claim 17, wherein the computer-executable instructions further cause the one or more processors to perform the following operation:
increasing power for certain operation if the power value is below the predetermined maximum power value.

19. The one or more computer-readable storage devices of claim 18, wherein the computer-executable instructions further cause the one or more processors to perform the following operation:
reducing the charging power and increasing the processing power corresponding to amount of the reduced charging power.

20. The one or more computer-readable storage devices of claim 15, wherein the computer-executable instructions further cause the one or more processors to perform the following operation:
reducing the charging power based on an increase in processing power to the device.

* * * * *